T. V. NICHOLS.
CUTTER-BARS FOR HARVESTERS.
No. 183,506. Patented Oct. 24, 1876.
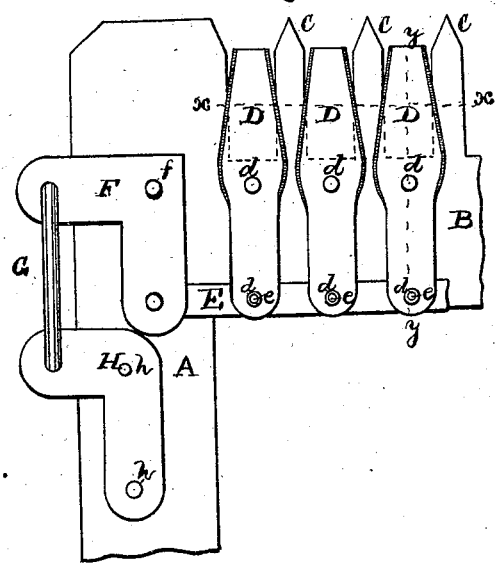
Witnesses
L. Van Riswick.
A. McCallum
Inventor:
Thos. V. Nichols,
By W. B. Richards,
Atty.

UNITED STATES PATENT OFFICE.

THOMAS V. NICHOLS, OF OLENA, ILLINOIS.

IMPROVEMENT IN CUTTER-BARS FOR HARVESTERS.

Specification forming part of Letters Patent No. 183,506, dated October 24, 1876; application filed February 1, 1876.

*To all whom it may concern:*

Be it known that I, THOMAS V. NICHOLS, of Olena, county of Henderson, and State of Illinois, have invented certain new and useful Improvements in Reaping and Mowing Machines, of which the following is a specification:

The nature of my invention relates to improvements in the cutting apparatus of reaping and mowing machines; and the invention consists in certain devices and combinations of devices connected with the construction and operation of the cutting apparatus, all as hereinafter more fully set forth.

To enable others skilled in the art to make and use my invention, I will now proceed to describe the same with reference to the accompanying drawings, in which—

Figure 1 is a top view of my cutting apparatus. Fig. 2 is a sectional view on the line $x\ x$ of Fig. 1. Fig. 3 is a sectional view on the line $y\ y$ of Fig. 1.

Referring to the parts by letters, letter A represents a bar, which may be supported on wheels or in any other suitable manner, and B is the finger-bar, projecting laterally from the bar A. Letters C represent the fingers projecting forward from the bar B flat in their cross-section, and beveled on their edges from below, as shown at Fig. 3, their sides straight and parallel and their ends pointed, as shown at Fig. 1. D are the cutter-blades, dart-head shaped, and their edges beveled from their upper sides, and are arranged in a series, one between each pair of fingers C, and are pivoted at $d$ to the finger-bar B. E is the cutter-bar, and has a series of annular projections, $e$, from its upper side, formed by punching from below, which projections $e$ form journals by which the cutter-bar is pivoted to the blades D, the shank of each blade being pierced with a hole, $d$, which receives one of the journals $e$. F is an elbow-lever, pivoted at $f$ to the bar A, and its longer arm pivoted to one end of the cutter-bar E, and its other end connected by a link, G, with the shorter arm of another elbow-lever, H, which is also pivoted at $h$ to the bar A, its longer arm being pierced with a hole, $h'$, by which it may be connected with any suitable actuating mechanism.

The operation of my invention is as follows: The device may be supported in any suitable manner, and propelling mechanism of whatever kind desired connected to the long arm of the elbow-lever H, to give said lever an oscillating movement on its axis $h'$, which will in turn be transmitted in the obvious manner to the cutter-blades D. The advancing fingers C will separate the stalks of the grain, which will then be severed by a shearing action between the blades D and fingers C. It will be seen that the metal from punching the holes in the cutter-bar E, being left to form the journals $e$, will not detract from the strength of the cutter-bar, as would be the case if they were removed and bolt-journals used. The arrangement of the elbow-levers shown and described is such as to give an increase of power at the cutter-blades D.

I claim—

1. The cutter-bar E, having the blade-journals $e$, formed by punching or striking up the metal from the lower or under side of the bar, substantially as set forth.

2. The cutter-bar E, having journals $e$, as described, in combination with the blades D, fingers C, and bar B, substantially as and for the purpose specified.

THOMAS V. NICHOLS.

Witnesses:
W. B. RICHARDS,
A. H. ALLEN.